(12) United States Patent
Hummel et al.

(10) Patent No.: US 8,842,403 B2
(45) Date of Patent: Sep. 23, 2014

(54) ELECTRIC SYSTEM

(75) Inventors: Alwin Hummel, Winkelhaid (DE);
Harald Schweigert, Vienna (AT)

(73) Assignee: Siemens Aktiengesellschaft, Munich (DE)

(*) Notice: Subject to any disclaimer, the term of this patent is extended or adjusted under 35 U.S.C. 154(b) by 589 days.

(21) Appl. No.: 13/058,731

(22) PCT Filed: Jun. 5, 2009

(86) PCT No.: PCT/EP2009/056914
§ 371 (c)(1),
(2), (4) Date: Feb. 11, 2011

(87) PCT Pub. No.: WO2010/018018
PCT Pub. Date: Feb. 18, 2010

(65) Prior Publication Data
US 2011/0141643 A1     Jun. 16, 2011

(30) Foreign Application Priority Data
Aug. 13, 2008 (AT) ................. A1269/2008

(51) Int. Cl.
*H02H 3/08* (2006.01)
*H02H 9/02* (2006.01)
*H02H 3/00* (2006.01)

(52) U.S. Cl.
CPC . *H02H 3/08* (2013.01); *H02H 3/006* (2013.01)
USPC ........................... 361/93.1; 361/18

(58) Field of Classification Search
USPC .................................. 361/18, 93.1
See application file for complete search history.

(56) References Cited

U.S. PATENT DOCUMENTS

| 5,245,496 A | 9/1993 | Kim |
| 5,512,883 A | 4/1996 | Lane, Jr. |
| 7,554,796 B2 * | 6/2009 | Coffey et al. ............. 361/643 |
| 2003/0086229 A1 | 5/2003 | Poe |

FOREIGN PATENT DOCUMENTS

| CN | 1643758 A | 7/2005 |
| CN | 101179187 A | 5/2008 |
| DE | 3902416 A1 | 8/1990 |
| DE | 4437351 A1 | 4/1996 |
| DE | 10359736 A1 | 7/2005 |
| FR | 1300743 A1 | 8/1962 |
| JP | 1218364 A | 8/1989 |
| JP | 2060410 A | 2/1990 |
| JP | 2001128354 A | 5/2001 |

* cited by examiner

*Primary Examiner* — Rexford Barnie
*Assistant Examiner* — Christopher Clark
(74) *Attorney, Agent, or Firm* — Cozen O'Connor

(57) ABSTRACT

An electrical system having at least one load that is protected by a protective device, where a tripping parameter, i.e., a tripping current of the protective device can be set. A control unit is provided to which a measured current value of the current consumed by the at least one load is supplied, where the control unit generates a limit value, which is provided to the protective device for setting a tripping parameter as a function of the characteristic curve of the measured current value. The control unit thus permits ongoing adjustment of the tripping parameters, i.e., the release current, according to the actual operating conditions.

24 Claims, 4 Drawing Sheets

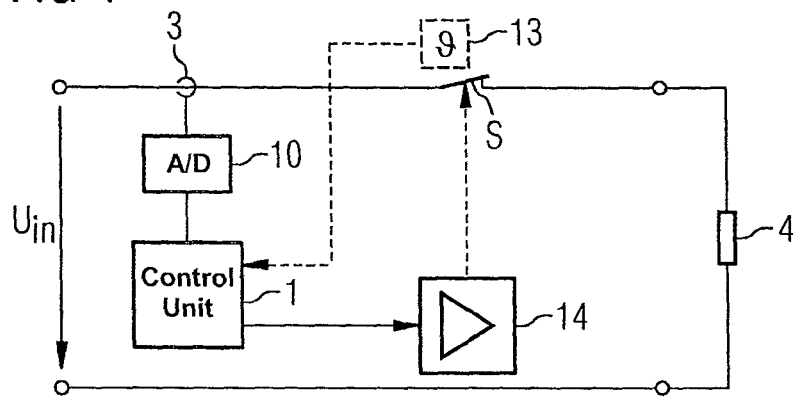
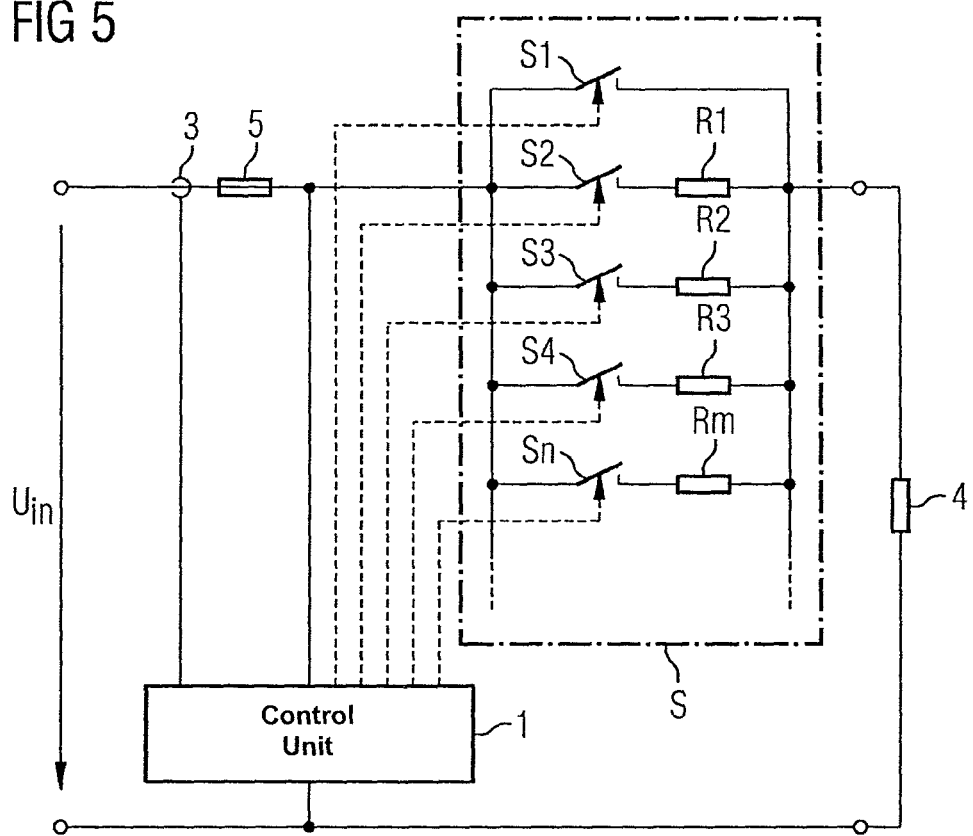

ELECTRIC SYSTEM

CROSS-REFERENCE TO RELATED APPLICATIONS

This is a U.S. national stage of International Application No. PCT/EP2009/056914, filed on 5 Jun. 2009. This patent application claims the priority of Austria Patent Application No. A1269/2008, filed 13 Aug. 2008, the entire content of which application is incorporated herein by reference.

BACKGROUND OF THE INVENTION

1. Field of the Invention

The invention relates to automated systems which include a supply circuit having hardwired loads and, more particularly, to an electrical system having at least one current-consuming load that is protected by a protective device, where a tripping parameter, i.e., a tripping current, of the protective device can be set. The invention also relates to a method for operating the electrical system.

2. Description of the Related Art

Typically, automation systems are production systems, process engineering systems or other industrially or commercially usable large-scale installations. Due to different requirements, systems of this kind are very rarely implemented in an identical design. Consequently, each system comprises different numbers and different sizes of loads. In order to avoid the outage of an entire system and, consequently, for example, interruptions to production in the event of a fault in a single load, each of the loads must be protected by a protective device, such as a cutout or circuit breaker.

Normally, a plurality of electrical loads of a system are combined into groups, with each group being protected against overloads or short-circuit by a protective device. Here, the groups are chosen such that the shutdown of one group does not inevitably lead to the total outage of the entire system. The protection for the loads or load groups is usually specified by a project engineer and subsequently installed or set by a technician. In conventional systems, adjustable protective devices are mainly used in these situations so as to allow adjustments to the tripping current to be performed as late as during an initial startup phase. The reason for this resides in the fact that the actual current consumption of the loads or load groups can only be determined to an inadequate degree during the project engineering and configuration phase. For example, individual control parameters are often not specified until after assembly and installation of the system have been completed, with the result that it is not clear in the preliminary phase which loads, such as solenoid valves, servomotors or contactor coils, will actually be in a switched-on state simultaneously during live operation.

During an initial startup, it is primarily underdimensioned protective devices that are correctively adjusted. In contrast, too highly dimensioned protective devices, in contrast, generally go unnoticed because not every operating state of every individual load or every individual load group can be taken into consideration, and because of the actual current consumption is measured during an initial startup. Selective tripping of individual protective devices is no longer ensured because in the event of a short-circuit or an overload it is sometimes no longer the too highly dimensioned, protective device disposed directly upstream of the affected load which trips, but a pre-fuse. As a result, major parts of the system are disconnected from power unnecessarily. In the worst case, the capacity of a power source (e.g., 24V control voltage) can be exceeded due to the short-circuit current, resulting in a failure of the entire system.

In addition to the absence of the protective function, it should also be taken into account that too highly dimensioned protective devices do not allow loads to be monitored. Loads may already be in a partially defective state without the corresponding protective device being tripped. In a partially defective state, sensors can record or transmit false signals or actuators can fail to perform control functions completely (e.g., a valve will not be fully closed). A protective device will trip only if there is a significant increase in current as a result of a total failure of the load.

SUMMARY OF THE INVENTION

It is therefore an object of the invention to provide an improved electrical system having an increased fault resilience and in addition to provide effective monitoring of individual loads or load groups of the electrical system.

These and other objects and advantages are achieved in accordance with the invention by an electrical system and method for operating the electrical system that includes a control unit to which a measured current value of the current consumed by the at least one load is supplied, where the control unit generates a new limit value as a function of the previous characteristic curve of the measured current value and the limit value is specified to the protective device for the purpose of setting a tripping parameter. In accordance with the invention, the control unit permits ongoing adjustment of the tripping parameters, i.e., the tripping current, according to the actual operating conditions. Cyclic current peaks are detected and, with a safety margin factored in, form the benchmark for specifying the limit value adjusted at time intervals for automatic corrective adjustment of the tripping parameters. As an example of a protective device, an isolating fuse or an electronic cutout is provided which limits the current to a predefined value in the event of a fault.

An excessively high disconnect value of the protective device that is not detected during the initial startup phase is corrected during operation of the system through specification of the adjusted limit value. Here, the limit value is derived directly from the characteristic curve of the actually occurring current consumption of the corresponding load. In this way, it is ensured that the tripping conditions of the protective device are matched to the given conditions at all times.

In an advantageous embodiment, the at least one load is supplied by a regulated clocked power supply. Power supplies of this kind typically have a current limiting device just above the rated current. For this reason, it is particularly important that the protective device provided for selective disconnection of an affected load is not overdimensioned. In other words, it must be ensured that an adequate short-circuit capacity is present for tripping the protective device. With a too highly dimensioned protective device, the clocked power supply would regulate the output voltage downward without the protective device separating the defective load from the rest of the supply network of a system.

Adjusting the tripping current of the protective device according to the actual current consumption of a load connected to the power supply ensures that, in the event of an overload as a result of a fault, the load will be disconnected by tripping of the protective device. This is particularly advantageous when a plurality of loads are connected to the same power supply. In that case, each load is protected for example, by its own dedicated protective device, so that a defective load does not result in all the connected loads being disconnected.

This therefore avoids a situation in which the power supply is regulated downward, and as a result the supply voltage drops before the protective device of a defective load is tripped.

In order to ensure the supply voltage (e.g., a control voltage) is maintained, in the event of a drop in the supply voltage, those electric circuits can be disconnected whose current flow at the present time is above the historic average value. The current which results as the average value of the most recent monitoring time interval (e.g., 1 day) or as a percentage of the set limit value, for example, should be regarded as the historic average value. If the power supply were to be overloaded, the entire system would go down. It is therefore expedient to deactivate all circuits which could be responsible for excess consumption.

Advantageously, the control unit includes a first memory which, when triggered by a timer, stores measured current values of the load. In this way, a history of the measured current values is available for specifying the new limit value for the tripping current of the protective device.

It is also of advantage if the control unit includes a microcontroller which, at predefined time intervals, generates a limit value from the measured current values stored in the first memory, where the limit value is stored in a second memory and supplied to the protective device. Provision for determining suitable limit values for every operating situation is made by an easy-to-program microcontroller. Different methods for specifying a limit value for the tripping current can therefore be used according to requirements. In this case, the limit value stored in the second memory up to the next time the limit value is determined represents the control variable for adjusting the tripping conditions of the protective device connected to the control unit.

In an embodiment of the invention, the protective device is implemented as a controlled electronic protective device. Here, the control unit for specifying the limit value can be integrated into the controller of the electronic protective device.

The electrical system in accordance with the invention is operated by a method in which after a monitoring time interval has elapsed the maximum measured current value that occurred within the monitoring time interval is determined, and the maximum measured current value is used together with at least one stored maximum measured current value of a preceding monitoring time interval or a predefined start value (e.g., the rated current) at the initial startup of the system to determine therefrom the limit value for setting the tripping current. In this way, it is ensured that the control unit specifies the new tripping current of the protective device only after a monitoring time interval which corresponds to an executed operating cycle having a detected current consumption peak.

Here, it is advantageous if the control unit is supplied with a feed voltage of the at least one load and that the limit value is determined as a function of the level of the feed voltage such that a static limit value is specified during ongoing operation and that a higher dynamic limit value is specified during a switch-on operation of the at least one load. Accordingly, a static limit value is specified for ongoing operation, where the static limit value typically is lower than the inrush current of the load. For the switch-on operation, a dynamic limit value is specified for the protective device, where the dynamic limit value takes into account the inrush current of the load. This is particularly important for loads with high inrush currents. Here, if the static limit value were to be higher than the inrush current, a fault current of the load during ongoing operation could go undetected.

The measured current value is beneficially filtered prior to being stored so that insignificant current peaks and sources of interference are masked out during the determination of a maximum measured current value. The filter thus prevents the limit value determination process from reacting to sources of interference and extremely short load peaks that can be triggered by switching actions for example. During the short load peaks an electronic cutout would switch into the linear or current limiting mode and build up dissipation loss.

In an embodiment of the invention, an adjustable duration of the monitoring time interval is specified to the control unit. This is beneficial especially when known operating cycles of the electrical system are present. The duration of the monitoring time interval is then made equal to the cycle duration, for example, or set to a longer time than the cycle duration.

In another embodiment, the duration of a monitoring time interval is defined such that the characteristic curve of the measured current values is initially recorded for the purpose of detecting a recurring sequence of consumption peaks and consumption minima, and such that following on therefrom a monitoring time interval is defined such that one consumption peak and one consumption minimum each fall within one monitoring time interval. The contemplated method is particularly suitable for electrical systems which on account of their particular complexity do not execute any predeterminable cycles. By recording a history with comparable load current patterns, it is revealed in a simple manner which cycles habitually occur.

In a further embodiment of the method of the invention, the duration of a monitoring time interval is determined by the occurrence of a predefinable number of instances of a specific threshold value of the measured current value and/or of a current-time integral being exceeded. Such an approach is useful, for example, for systems whose loads have irregular operating times. Succeeding monitoring time intervals then last different lengths of time depending on how often a current threshold value or a threshold value of the current-time integral is reached.

In order to determine a limit value, a safety margin is advantageously applied to the maximum measured current values determined in the monitoring time intervals. There is then an upward safety margin for the next monitoring time interval, such that a normal increase in current consumption (e.g., due to weather conditions) does not lead to tripping of the protective device. This safety margin can range between 1% and 50% for example.

In this case, it is favorable if the safety margin is increased or reduced according to a predefinable curve with increasing operating time of the electrical system. In this way, as the duration of the current consumption monitoring increases, the set tripping current is brought closer to the actual conditions.

In a contemplated embodiment for determining a limit value, the limit value is specified as an average of the maximum measured current values determined within elapsed monitoring time intervals and those to which the safety margin has been applied.

In another embodiment the maximum measured current value determined in the most recently elapsed monitoring time interval and the still applicable limit value are averaged to determine a new limit value. Optionally, recourse can also be made to a plurality of historic limit values for averaging purposes, thereby achieving a stronger weighting of the preceding maximum measured current values.

On the other hand, it can be beneficial if during the determination of the limit value the maximum measured current value of the most recently elapsed monitoring time interval is weighted more strongly than the values of the previously elapsed monitoring time intervals. In this way, it is ensured that ongoing changes in the operation of the system lead to a corresponding change in the tripping conditions of the protective device. A further possibility consists in changing the weighting as the number of elapsed monitoring time intervals increases. This enables a slower or faster approximation to the current situation to be achieved.

At the same time, it is also provided that if there is an increase in the maximum measured current values within succeeding monitoring time intervals the most recent maximum measured current value will be weighted more strongly than if the maximum measured current values decrease. In this way, it is ensured that, for example, minor expansions to an installation and consequently an increase in power consumption within the safety margin do not lead immediately to a tripping of the protective device if there is a further slight increase in power consumption. When the limit value is raised it should, however, be taken into account that it must be possible to distinguish with certainty between a normal increase in power consumption and an overcurrent. Here, the gradient of the current increase constitutes the essential criterion. For example, the power consumption increases slowly as a result of contaminating fans, poor lubrication or seasonal stiffness of actuating elements. In the case of a fault current needing to be switched off, on the other hand, what occurs in the majority of cases is a pronounced current peak or an overcurrent which increases to a maximum value in a very short rise time and remains there.

In an advantageous embodiment, a dynamic limit value is defined such that during permissible overcurrents the characteristic curve of the measured current value is recorded and that a characteristic curve for the dynamic limit value is specified as a function of a plurality of such characteristic curves. Permissible overcurrents occur, for example, when loads are activated or when capacitors are charged during a switch-on operation. Accordingly, an envelope which is produced as a result of overlaying a plurality of permissible overcurrent characteristic curves, with inclusion of a safety margin, is specified as a tripping condition for the protective device. The permissibility of an overcurrent is generally determined by the duration of the occurring overcurrent and its magnitude in relation to a rated current.

In another advantageous embodiment, a current-time integral, which is derived from a plurality of characteristic curves of the measured current value during a switch-on operation, is specified as the dynamic limit value. The tripping criterion for the protective device is then likewise determined by a current-time integral of an occurring overcurrent.

In another advantageous embodiment, the limit value and/or the characteristic curve of the limit value are/is limited by an upper limit which is predefined by the fire protection conditions applicable to the components which are disposed downstream of the protective device and/or by their capacity. Here, either a maximum value or a specific time characteristic curve is predefined as the limit value.

In another advantageous embodiment, for early detection of malfunctions, a critical value is predefined for the increase in a limit value and, an alarm signal is triggered upon the critical value being exceeded. As a result, the overheating of a bearing, for example, can be detected before a total failure occurs or before the tripping conditions of the corresponding protective device are reached. It should be left to the user to choose only an increase over a year to mask out atmospheric conditions, or some other time period. In order to guarantee user safety, it may be beneficial to use the actual maximum measured values per monitoring time interval rather than the slowly decreasing limit values for the purpose of triggering an alarm signal (e.g., generate an alarm if a predefined percentage increase is exceeded).

In an embodiment of the method, the control unit is supplied with an external signal by which the duration of the monitoring time intervals is modified by a predefinable factor on an event-related basis. Shorter monitoring time intervals than during ongoing operation can be specified after a system shutdown or replacement of a defective protective device. The tripping current is then adjusted more rapidly to the prevailing operating conditions based on a preset starting value.

In a further embodiment, the control unit is supplied with a reset signal by which a limit value is reset to a default value. This is useful after interruptions in the operation of the electrical system to execute a full operating cycle with the default value before a new limit value is specified to the protective device. For example, the default value specifies to the protective device a breaking current defined by the fire protection provisions applicable to the downstream circuit elements. In this case, the reset signal can also be present at the control unit for a longer period of time, thereby inhibiting the forming of a new limit value for the duration of said time period. This is useful, such as for fault localization in the case of different switching actions of individual loads.

This default value is also specified to the protective device at the time of an initial startup of the electrical system. In this way, it is ensured that from the outset the maximum values of the current or of the current-time integral predefined for the current-carrying elements of the system by the fire protection provisions are not exceeded.

Finally, it is of advantage if the present limit value or, as the case may be, the static and/or dynamic limit value as well as the present measured current value and/or the characteristic curve of the measured current value are/is indicated by a suitable display unit and/or output over an interface. In this case, for example, the limit values of the most recent monitoring time intervals (e.g., 64 daily limit values) or the measured current values of the last milliseconds which are stored, e.g., in a ring buffer can be read out. In this way the present state of the electrical system is evident at all times to operating personnel of the system.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in an exemplary manner below with reference to the attached schematic figures, in which:

FIG. 4 shows an arrangement with a breaking protective device in accordance with the invention;

FIG. 5 shows an arrangement with a plurality of mechanical circuit breakers connected in parallel in accordance with the invention;

DETAILED DESCRIPTION OF THE PREFERRED EMBODIMENTS

Figure 1:
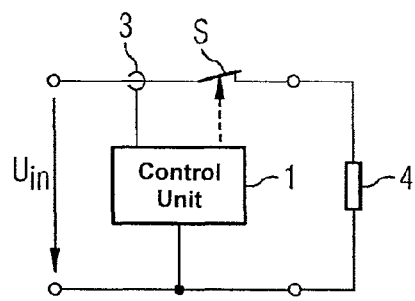
FIG. 1 shows an arrangement with adjustable protective device in accordance with the invention.

FIG. 1 shows an embodiment in accordance with the invention. A load 4 is connected to a feed voltage $U_{in}$, such as an alternating-current voltage of a power supply network. The feed voltage $U_{in}$ can, however, also be an output direct-current voltage of a switched-mode power supply. A protective device S is disposed in the power path. In the simplest case the device consists of a mechanical switch which is controlled by a control unit 1.

The tripping of the protective device S occurs based on predefined tripping conditions, where the corresponding tripping parameters are settable by the control unit 1. Suitable tripping parameters include a value for the tripping current, a maximum permissible duration of an overcurrent or a maximum permissible line temperature. A disconnection or current limiting of the downstream load 4 is then performed if one of the tripping parameters is exceeded.

In accordance with the invention, at least one tripping parameter of the protective device S is set to a new value after a monitoring time interval has elapsed. Toward that end, the current consumed by the load 4 is measured by a current measuring device 3 and supplied as a measured current value to the control unit 1. The control unit 1 includes suitable a storage device for forming a history which initially serves for determining a maximum value during an elapsed monitoring time interval.

A maximum measured current value is therefore determined and stored for each monitoring time interval to form a limit value therefrom for adjusting a tripping parameter. In the simplest case, the average of at least two most recently determined maximum measured current values is used as the limit value. Advantageously, a safety margin should also be provided. At the time of initial startup, a default value (e.g., a rated current) is taken as a basis.

The maximum permissible tripping current $I_{action}$ as the limit value to be determined is then calculated after the n-th monitoring time interval has elapsed using the maximum measured current value $\hat{I}$ determined within one monitoring time interval, e.g., as follows:

$$I_{action(n+1)}=[(\hat{I}_{(n)}+\hat{I}_{(n-1)}]/2$$

It is useful to multiply the most recently determined maximum measured current value by a factor X to achieve a stronger weighting of more recent operating changes:

$$I_{action(n+1)}=[(\hat{I}_{(n)}+\hat{I}_{(n-1)}*X]/(1+X)$$

The thus determined limit value is specified to the protective device as the new tripping current either directly or according to a scale. For example, if the change in the tripping current of a protective device is possible only in increments of ten, then the value that is next above the determined limit value is specified as the tripping current.

The correct setting of a tripping parameter is dependent on the duration of the monitoring time intervals. The choice of the monitoring time intervals is geared to the operating cycles of the electrical system. Here, an operating cycle is determined by a pattern in the sequence of different operating states of the system component that is disposed downstream of the protective device, where the pattern occurs repeatedly in similar form in each operating cycle. Such a system component can include either only one variably operated load or a plurality of loads operated in time-staggered fashion. The pattern in the sequence of different operating states is produced, for example, as a result of recurring method steps or as a result of a predefined shift operation of a production system.

The advantage of the present invention takes effect in this case when the time characteristic of the current consumption of the loads protected by the protective device is not precisely predictable or the overhead required for the determination process is too high.

Figure 2:
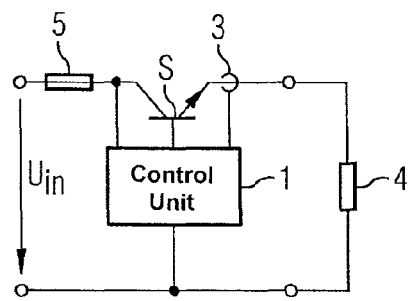
FIG. 2 shows an arrangement with a current-limiting protective device in accordance with the invention.

FIG. 2 shows an arrangement having a protective device S embodied as an electronic cutout. In this case, a semiconductor switch disposed in the power path is driven in a pulsed or linear manner in the event of a fault, and in this way the current is held at a predefined maximum value irrespective of the behavior of the load, or the rated load prior to the occurrence of the fault situation (e.g., a short-circuit). In order to comply with fire protection regulations, it is usually stipulated that a mechanical or electromechanical cutout 5 (e.g., a circuit breaker) be connected upstream of the electronic cutout, which cutout is tripped in any event if the electronic cutout fails.

Figure 3:
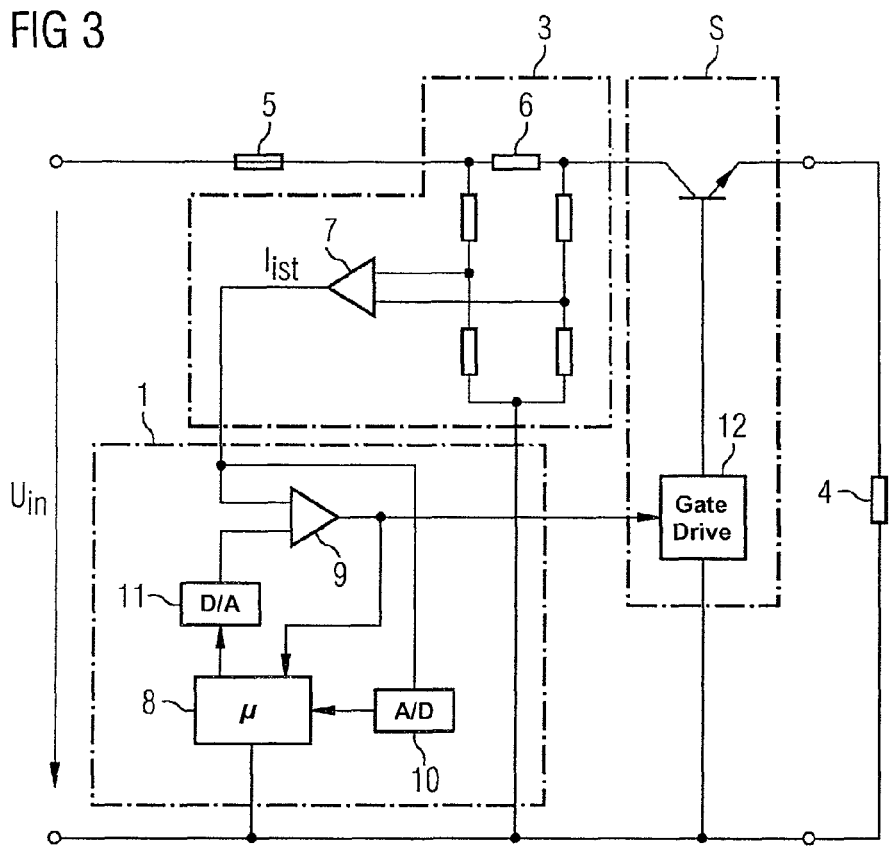
FIG. 3 shows an arrangement with an exemplary schematic block diagram of the control unit in accordance with the invention.

An exemplary embodiment of the control unit 1 is shown in FIG. 3. The load current is measured by a current measuring device 3 which includes a shunt resistance 6 by which the measured current value $I_{actual}$ is determined with a differential amplifier 7. The measured current value $I_{actual}$ is supplied, on the one hand, to a comparator 9 and, on the other hand, to a microcontroller 8 by an analog-digital converter 10. The comparator 9 compares the measured current value $I_{actual}$ with a reference value which is generated by the microcontroller 8 and passed on to the comparator 9 through a digital-analog converter 11.

The output of the comparator 9 is connected, on the one hand, to the microcontroller 8 for determining a monitoring time interval and, on the other hand, to a gate drive 12 for driving the semiconductor switch of the protective device S in a pulsed or linear manner.

A simplified arrangement is shown in FIG. 4. The control unit 1 embodied as a microcontroller receives the measured value of a current measuring device 3 from an analog-digital converter 10. If the present tripping parameter is exceeded, a tripping signal is transmitted by the microcontroller through a signal amplifier 14 to the switching element of the protective device S. If a mechanical switching element is used, the defective load 4 is disconnected from the feed voltage $U_{in}$. An electronic switch can be used for limiting an overcurrent.

Optionally, the control unit 1 is supplied with a temperature value θ which signals a critical line temperature and is measured by a temperature sensor 13. The temperature value θ is used, for example, as a further tripping parameter or for determining the loading at the present instant in relation to the maximum permissible loading with regard to the fire protection regulations.

A further possibility of limiting an overload current by the protective device S is shown in FIG. 5. In this case, a plurality of switches S1 . . . Sn are connected in parallel in the power path. In normal operation, the load current flows through a first switch S1. A resistor R1 . . . Rm is disposed in series with each of the remaining switches S2 . . . Sn. Each switch S1 . . . Sn is controlled by the control unit 1. If a load 4 is defective, the first switch S1 is opened and one or more of the remaining switches are closed. In this arrangement the values of the resistors R1 . . . Rm are binary-stepped, for example, so that stable limiting of the overcurrent is effected through closing the corresponding switches S2 . . . Sn. If the switches S1 . . . S2 are implemented as semiconductor elements, an additional fusible cutout 5 should be provided in the power path for fire protection reasons.

A protective device S is tripped as a result of a static or dynamic limit value of the tripping current being exceeded. An exceeding of the dynamic limit value is identified by the characteristic curve of a transient overcurrent and is usually established by a current-time integral.

Figure 6:
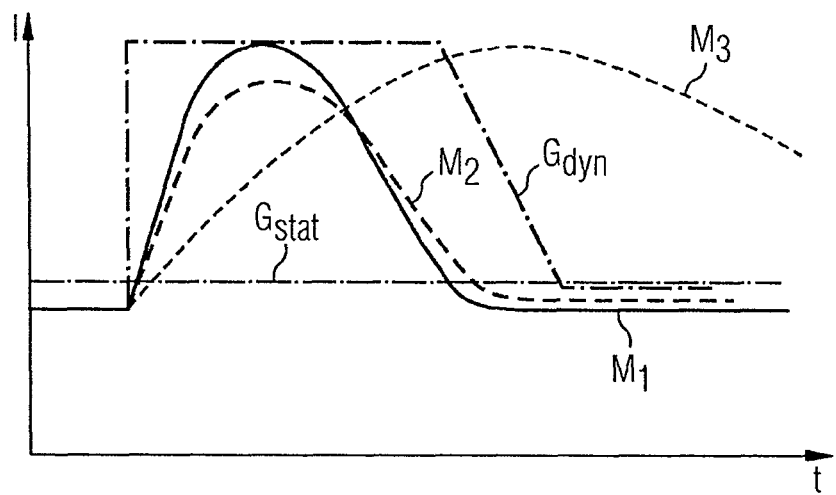
FIG. 6 shows graphical plots of curve shapes under dynamic loading.

Transient overcurrents above the static limit value of the tripping current should be tolerated since these often occur during load switch-on operations. FIG. 6 shows graphical plots of various characteristic curves of the current during a switch-on operation. The static limit value $G_{stat}$ determines the tripping current during ongoing operation. The dynamic limit value $G_{dyn}$ is indicated as an envelope over tolerable characteristic curves $M_1$, $M_2$ of an inrush current. At no time do the tolerable characteristic curves $M_1$, $M_2$ exceed the characteristic curve of the dynamic limit value $G_{dyn}$. In a further illustrated characteristic curve $M_3$ of an inrush current, both the static limit value $G_{stat}$ is exceeded for a longer time than permitted and the current-time area of the dynamic limit value $G_{dyn}$ is also exceeded. Consequently, the protective device S is tripped.

In addition to the above-described setting of the static limit value $G_{stat}$, the dynamic limit value $G_{dyn}$ is also adjusted to the actual operating conditions of the electrical system. Here, a default value, which takes into account the maximum tolerable overvoltages at the time of the commissioning of the system, is initially specified to the protective device S. The default value corresponds, e.g., to the maximum current limiting capacity of an electronic limiter or to the $I^2t$ value of a sensitive load.

As described above, the current consumption of the load 4 or of the load group is measured during a monitoring time interval and evaluated. At the same time, the feed voltage $U_{in}$ is additionally monitored by the control unit 1, where a switch-on operation is detected by a drop in the feed voltage $U_{in}$. In order to determine the static limit value $G_{stat}$, the tolerable overvoltages during a switch-on operation are masked out by a suitable filter (analog or digital). The interference peaks are accordingly ignored during the forming of the maximum measured current values of a monitoring time interval. In order to adjust the dynamic limit value $G_{dyn}$ to the actual operating conditions, on the other hand, only the tolerable overcurrent characteristic curves are used. Here, characteristic curves of transient overcurrents are stored, for example, during one or more monitoring time intervals and an envelope is formed therefrom, in which case a safety margin should be provided. Here, the dynamic limit value $G_{dyn}$ determined in this way must not exceed the default setting, because this represents the limit for compliance with the fire protection requirements.

In order to determine a tripping instance of the protective device S, the characteristic curve of the load current is then either constantly compared with the envelope characteristic curve of the set dynamic limit value $G_{dyn}$, or a current-time integral of the load current is constantly formed and compared with a dynamic limit value $G_{dyn}$ expressed as a current-time integral.

Figure 7:
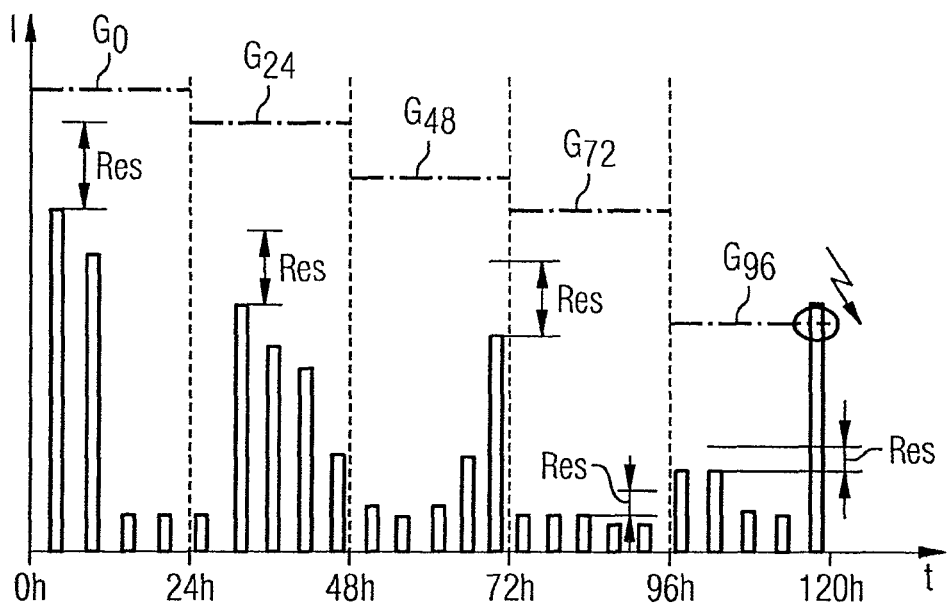
FIG. 7 shows a graphical plot of the maximum measured current values and limit values derived therefrom over time.

An exemplary determination of a static limit value $G_{stat}$ is illustrated in FIG. 7, where the load current I is plotted over the operating time t. Here, the operating cycles of the corresponding electrical system follow a fixed daily rhythm, i.e. the current consumption patterns are repeated in a similar manner every 24 hours. Accordingly, a monitoring time interval is set at 24 hours. During startup, a default limit value $G_0$ is set initially.

In electrical systems that have no predictable operating cycle, the default limit value $G_0$ is maintained after startup until such time as an approximately repeating pattern of the load current characteristic curve is revealed from the recording of the measured current value. For that purpose maximum and minimum current values are particularly evaluated to derive operating cycles therefrom. The monitoring time intervals for the further determination of the limit values are then set in accordance with these operating cycles. If no pattern for the current consumption can be recognized over a relatively long period of time, an adequate length of time (defined as a default value), such as one week, is set as the monitoring time interval for determining a new limit value.

After a set monitoring time interval has elapsed, the maximum measured current value that occurred during the monitoring time interval is determined and a safety margin Res is applied to the maximum measured current value. The value formed in this way is specified to the protective device as the first adjusted limit value $G_{24}$. During the following monitoring time interval, the limit value $G_{24}$ forms the tripping current of the protective device S.

The new maximum measured current value, to which a safety margin Res is in turn applied, is determined from the recording of the load current in the second monitoring time interval after the monitoring time interval has elapsed. The new limit value $G_{48}$ is then determined as the average value of the maximum measured current value to which the safety margin Res has been applied and the still valid limit value $G_{24}$. In this case, a weighting can be applied, for example, to make greater allowance for the most recently prevailing operating states.

The limit values $G_{72}$, $G_{96}$ are formed in the same way after the succeeding two monitoring time intervals have elapsed. During the fifth monitoring time interval, the most recently determined limit value $G_{96}$ applies. Shortly before 120*h* in FIG. 7, a load current occurs that exceeds the limit value $G_{96}$ and leads to an activation of the protective device S.

In this case, it can by all means happen that due to the adjustment of the limit values to the prevailing operating conditions, a fault situation occurs that would not have led to tripping of the protective device S in past monitoring time intervals owing to other operating conditions at that time. The example therefore clearly illustrates that a protective device whose tripping conditions are not adjusted to the prevailing operating conditions will become overdimensioned over time and will not trip when a malfunction occurs.

A measured current value that leads to the tripping of the protective device S is masked out during the subsequent forming of a maximum measured current value of a monitoring time interval. Accordingly, after a fault that has occurred has been rectified and a system restart performed, the most recently valid limit value and the most recently determined maximum measured current value will be used for determining the next limit value without taking the fault current into account. Alternatively, a default limit value can be specified to the protective device S following a restart and the determination of the succeeding limit values starts based on the default limit value.

By a suitable duration of the monitoring time intervals and a suitable choice of the safety margins and of the weighting during averaging, it is possible to avoid the limit values being lowered too rapidly or raised too slowly. Reducing the limit values too quickly or increasing them too slowly would cause the safety device S to trip as a result of normal operation-related increases in current. In this case, it should be taken into account in particular that in the event of increases in current consumption resulting, e.g., due to noncritical signs of wear or on account of operational changes, the limit values are increased sufficiently quickly through appropriate weighting of the most recent measured current values.

Figure 8:
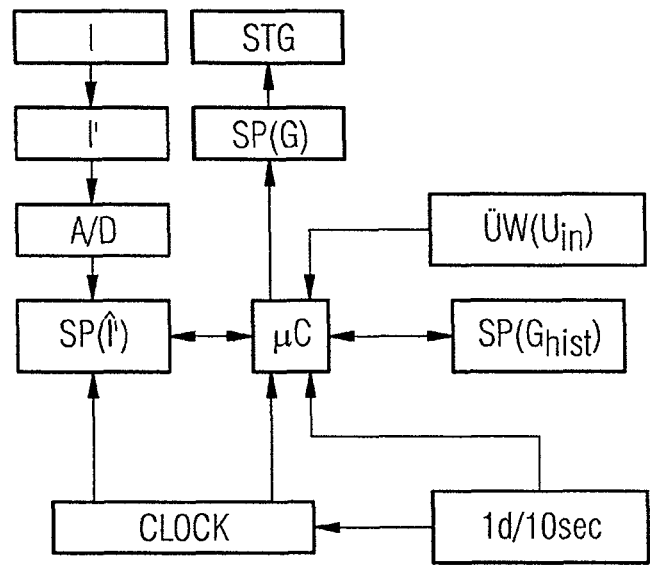
FIG. 8 is a flow chart of the method in accordance with the invention.

FIG. 8 shows an exemplary signal scheme of the control unit 1. First, the load current I is measured by a current measuring device 3. Sources of interference and tolerable dynamic load peaks are masked out a filter and the thus filtered measured current signal I' is supplied to an analog-digital converter A/D. In this case, the time constant of the filter is aligned to the time that, e.g., an electronic cutout can run in the active current limiting mode (U*I at the power transistor of the cutout, such as 20-50 ms).

The ongoing filtered measured current values are stored in a maximum value memory SP(Î') and are available to a microcontroller μC for the purpose of forming a maximum measured current value. In this case, e.g., a timer CLOCK determines the duration of a monitoring time interval. The duration of the monitoring time interval can be adjusted by a corresponding signal transducer 1 d/10 sec.

Following termination of a monitoring time interval, the microcontroller μC calculates a new limit value from the present maximum measured current value and the still valid limit value. This is effected in the simplest manner by averaging. Limit values of past monitoring time intervals are stored in a history memory $SP(G_{hist})$ and are available to the microcontroller μC.

The newly calculated limit value is stored in an output memory SP(G) and forwarded to the controller STG of the protective device for the purpose of adjusting a tripping parameter.

The microcontroller μC is also supplied with the signal of a feed voltage monitoring element $ÜW(U_{in})$ for detecting a switch-on operation. The dynamic inrush current of the connected load or load group is filtered out during the determination of the maximum measured current value. In addition, a dynamic limit value is used as the tripping parameter of the protective device S during a switch-on operation. Furthermore, if the feed voltage drops below a default value (e.g., 85% of the rated current) a channel or, as the case may be, a circuit is switched off if an unusually high current (historically speaking) flows.

Figure 9:
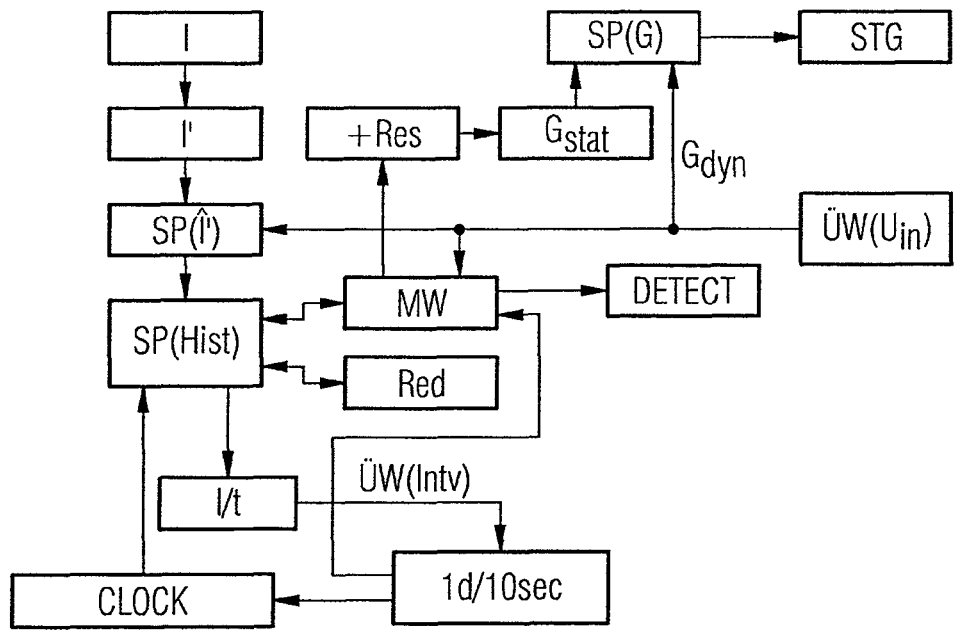
FIG. 9 is a flow chart of the method including early fault detection in accordance with the invention.

In addition to the ongoing limit value adjustment, the signal scheme depicted in FIG. 9 takes into account a slow current increase of a load which has a creeping fault.

In this case, the maximum value memory SP(Î') is supplied, on the one hand, with the filtered measured current values and on the other hand, by the feed voltage monitoring element $ÜW(U_{in})$ with a signal for masking out inrush currents. On the one hand, the measured current values and, on the other hand, the limit values of the elapsed monitoring time intervals are stored in a history memory SP(Hist). An averager MW accesses the history memory SP(Hist) and calculates a new limit value from the stored values. In this case, the history memory SP(Hist) is connected to a data reduction device Red for managing the stored values.

The values stored in the history memory SP(Hist) are supplied to an evaluation unit I/t for the purpose of determining the load-time behavior. The time intervals within which high current consumption values are recorded are checked. On the basis of this evaluation, the monitoring time intervals can be adjusted by a corresponding signal transducer 1 d/10 sec (if, e.g., 24 h is not sufficient as an average time period).

The monitoring time interval can also be modified by operating personnel, optionally with the possibility of an automatic reset. This is useful, for example, for defining a learning period with short monitoring time intervals.

The new limit values formed are supplied to a detector DETECT for the purpose of detecting a slow increase in current. When a predefined threshold value is reached, a signal is output to a warning device which signals to the operating personnel that a creeping fault is present.

During a switch-on operation, a dynamic limit value $G_{dyn}$ is specified to the output memory SP(G), whereas during ongoing operation the average value to which a safety factor Res has been applied is present as a static limit value $G_{stat}$.

Thus, in order to reduce the risk of erroneous tripping of the protective device, maximum curve shapes of the load current can also be stored and used for forming limit values instead of the maximum measured current values. Consequently, each time a current limit value is exceeded the time characteristic curve is also compared with earlier time characteristic curves of overcurrents. In this way, the control unit 1 learns current consumption patterns that are typical for the system, with a tripping of the protective device being induced only if the current consumption patterns are hugely exceeded.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. An electrical system comprising:
    at least one load;
    a protective device having a settable tripping parameter for protecting the at least one load; and
    a control unit coupled to the at least one load for receiving a measured current value of the current consumed by the at least one load, the control unit being configured to determine a maximum measured current value that occurred within a monitoring time interval after elapse of the monitoring time interval, and being configured to determine a limit value as a function of a characteristic curve of a measured current value for setting a tripping current based on the maximum measured current value and at least one stored maximum measured current value of a preceding monitoring time interval, the settable tripping parameter of the protective device being set to protect the at least one load based on the determined limit value;
    wherein the control unit generates the limit value as a function of the characteristic curve of the measured current value, the limit value being specified to the protective device for setting the tripping parameter;
    wherein a safety margin is applied to maximum measured current values determined in monitoring time intervals to determine the limit value; and
    wherein the limit value is specified as an average of the maximum measured current values determined within elapsed monitoring time intervals and those to which the safety margin has been applied.

2. The electrical system as claimed in claim 1, wherein power is supplied to the at least one load by a regulated clocked power supply.

3. The electrical system as claimed in claim 1, wherein the control unit includes a first memory which, when triggered by a timer, stores the measured current values of the at least one load.

4. The electrical system as claimed in claim 2, wherein the control unit includes a first memory which, when triggered by a timer, stores the measured current values of the at least one load.

5. The electrical system as claimed in claim 3, wherein the control unit includes a microcontroller which generates the limit value from the measured current values stored in the first memory at predefined time intervals, the limit value being stored in a second memory and supplied to the protective device.

6. The electrical system as claimed in claim 1, wherein the protective device comprises a controlled electronic protective device.

7. The electrical system as claimed in claim 1, wherein the settable tripping parameter is a tripping current.

8. A method for operating an electrical system having at least one load, a protective device having a settable tripping parameter for protecting the load and a control unit coupled to the at least one load for receiving a measured current value of the current consumed by the at least one load, the control unit generating a limit value as a function of a characteristic curve of the measured current value, the limit value being provided to the protective device for setting the tripping parameter, the method comprising:
   determining, at the control unit, a maximum measured current value that occurred within a monitoring time interval after elapse of the monitoring time interval;
   determining, at the control unit, the limit value as the function of the characteristic curve of the measured current value for setting a tripping current based on the maximum measured current value and at least one stored maximum measured current value of a preceding monitoring time interval; and
   setting the tripping parameter of the protective device to protect the at least one load based on the determined limit value;
   wherein a safety margin is applied to maximum measured current values determined in monitoring time intervals to determine the limit value; and
   wherein the limit value is specified as an average of the maximum measured current values determined within elapsed monitoring time intervals and those to which the safety margin has been applied.

9. The method as claimed in claim 8, wherein the control unit is supplied with a feed voltage of the at least one load;
   wherein the limit value is determined as a function of a level of the feed voltage such that a static limit value is specified during ongoing operation; and
   wherein a higher dynamic limit value is specified for a switch-on operation of the at least one load.

10. The method as claimed in claim 8, wherein prior to being stored the measured current value is filtered such that insignificant current peaks and sources of interference are masked out during said step of determining the maximum measured current value.

11. The method as claimed in claim 8, wherein an adjustable duration of the monitoring time interval is provided to the control unit.

12. The method as claimed in claim 8, wherein a duration of the monitoring time interval is defined such that the characteristic curve of measured current values is initially recorded for detecting a recurring sequence of consumption peaks and consumption minima; and
   wherein the monitoring time interval is subsequently defined such that one consumption peak and one consumption minimum each fall within one monitoring time interval.

13. The method as claimed in claim 8, wherein a duration of the monitoring time interval is determined by at least one of an occurrence of a pre-definable number of instances of a specific threshold value of the measured current value and a current-time integral being exceeded.

14. The method as claimed in claim 8, wherein the safety margin is one of increased and reduced in accordance with a pre-definable curve with increasing operational time of the electrical system.

15. The method as claimed in claim 8, wherein a new limit value is determined as an average of the maximum measured current value determined in a most recently elapsed monitoring time interval and a still valid limit value.

16. The method as claimed in claim 8, wherein during the determination of the limit value the maximum measured current value of the most recently elapsed monitoring time interval is weighted more strongly than the values of the previously elapsed monitoring time intervals.

17. The method as claimed in claim 16, wherein if there is an increase in the maximum measured current values within succeeding monitoring time intervals the maximum measured current value that occurred most recently is weighted more strongly than if there is a decrease in the maximum measured current values.

18. The method as claimed in claim 9, wherein during permissible overcurrents the characteristic curve of the measured current value is recorded; and
   wherein a characteristic curve for the higher dynamic limit value is specified as a function of a plurality of such characteristic curves.

19. The method as claimed in claim 9, wherein a current-time integral derived from a plurality of characteristic curves of the measured current value during a switch-on operation is specified as the higher dynamic limit value.

20. The method as claimed in claim 8, wherein at least one of the limit value and a characteristic curve of the limit value is limited by an upper limit predefined by at least one of fire protection conditions applicable to components disposed downstream of the protective device and by a capacity of the components disposed downstream of the protective device.

21. The method as claimed in claim 8, wherein a critical value is predefined for an increase in the limit value; and
   wherein an alarm signal is triggered if the critical value is exceeded.

22. The method as claimed in claim 8, wherein the control unit is supplied with an external signal for modifying a duration of monitoring time intervals on an event-related basis.

23. The method as claimed in claim 8, wherein the control unit is supplied with a reset signal for resetting the limit value to a default value.

24. The method as claimed in claim 8, wherein at least one of a present limit value, a static limit value, a dynamic limit value and a present measured current value, and the characteristic curve of the measured current value is indicated by at least one of a display unit and an output over an interface.

* * * * *